(12) United States Patent
Wu

(10) Patent No.: US 7,153,072 B2
(45) Date of Patent: Dec. 26, 2006

(54) CLAMPING DEVICE FOR KEY DUPLICATING MACHINE WITH DUAL PIVOTED JOINT

(76) Inventor: Kuo-Shen Wu, No. 10, Alley 14, Lane 74, Pa Ta Road, Section 3, Taipei (TW)

(*) Notice: Subject to any disclaimer, the term of this patent is extended or adjusted under 35 U.S.C. 154(b) by 27 days.

(21) Appl. No.: 10/976,439

(22) Filed: Oct. 29, 2004

(65) Prior Publication Data

US 2006/0093451 A1    May 4, 2006

(51) Int. Cl.
*B23C 3/35* (2006.01)
(52) U.S. Cl. .................... 409/81; 409/82; 409/83; 72/110
(58) Field of Classification Search ................ 409/81, 409/82, 83; 76/110, 79.5; 408/72 R; 269/902
See application file for complete search history.

(56) References Cited

U.S. PATENT DOCUMENTS

| | | | | |
|---|---|---|---|---|
| 4,051,748 A | * | 10/1977 | Sherman | 409/81 |
| 4,378,107 A | * | 3/1983 | Wagster et al. | 269/95 |
| 4,592,683 A | * | 6/1986 | Wu | 409/83 |
| 4,614,465 A | * | 9/1986 | Wu | 409/81 |
| D297,143 S | * | 8/1988 | Wu | D15/125 |
| 4,934,674 A | * | 6/1990 | Bernstein | 269/43 |
| 4,986,519 A | * | 1/1991 | Lee | 269/137 |
| 5,242,159 A | * | 9/1993 | Bernstein | 269/32 |
| 5,906,365 A | * | 5/1999 | Wu | 269/43 |
| 5,951,218 A | * | 9/1999 | Wu | 409/81 |
| 5,984,597 A | * | 11/1999 | Chen | 409/81 |
| 6,179,279 B1 | * | 1/2001 | Asai et al. | 269/902 |

* cited by examiner

*Primary Examiner*—Monica Carter
*Assistant Examiner*—Dana Ross
(74) *Attorney, Agent, or Firm*—Ladas & Parry LLP

(57) ABSTRACT

A clamping device for key duplicating machine with dual pivoted joint comprising a pair of left and right symmetrical cross grooves formed on the front side of a substrate, and aligned one with the other, for securing a pair of left and right vises, in order to enable the same pair of vises to clamp different types of keys by turning and changing from one of the two confronting side edges of the vises to the other; and two pivoted joints provided on the back side of the substrate, for rotating the pair of left and right vises to a different angular position, and for effecting duplication of the different types of keys.

3 Claims, 3 Drawing Sheets

CLAMPING DEVICE FOR KEY DUPLICATING MACHINE WITH DUAL PIVOTED JOINT

BACKGROUND OF THE INVENTION

The present invention relates to a clamping device for key duplicating machine with dual pivoted joint, which can clamp different types of key sample and key blank by simply turning and changing from one of the two confronting side edges of the vises to the other, and can effect duplication of the different types of keys by means of two pivoted joints.

Conventional clamping device for key duplicating machine can only be used to clamp with a single side edge a specific type of key e.g. a small size of flat key or a large size of cylindrical key, and hence each type of key requires a specific clamping device. This will result in an increase of the key duplicating cost. Further, in the conventional clamping device for key duplicating machine, the key blank to be processed and clamped on the clamping device can only be cut in a tangential direction by a cutting tool, and can not be cut obliquely, and hence such kind of clamping device can only be used for clamping a key having a teeth pattern of grooves cut in a direction perpendicular to the side plane of the key, and can not be used for those having a teeth pattern of grooves cut obliquely to the side plane of the key, otherwise a special designed and complicated jig is required.

The present invention aims at eliminating the above disadvantages and provides a clamping device for key duplicating machine with dual pivoted joint, which can clamp different types of keys by simply turning and changing from one of the two confronting side edges of the vises to the other, and can effect duplication of the different types of keys by means of two pivoted joints.

In a preferred aspect of the present invention, the clamping device for key duplicating machine with dual pivoted joint comprises a pair of left and right symmetrical cross grooves formed on the front side of a substrate, and aligned one with the other, for securing a pair of left and right vises, in order to enable the same vises to clamp different types of keys by turning and changing from one of the two confronting side edges of the vises to the other; and two pivoted joints provided on the back side of the substrate, for rotating the pair of left and right vises to a different angular position, and for effecting duplication of the different types of keys.

BRIEF DESCRIPTION OF THE DRAWING

An embodiment of the present invention will now be described by way of example with reference to the accompanying drawings in which.

DETAILED DESCRIPTION OF THE INVENTION

Figure 1:
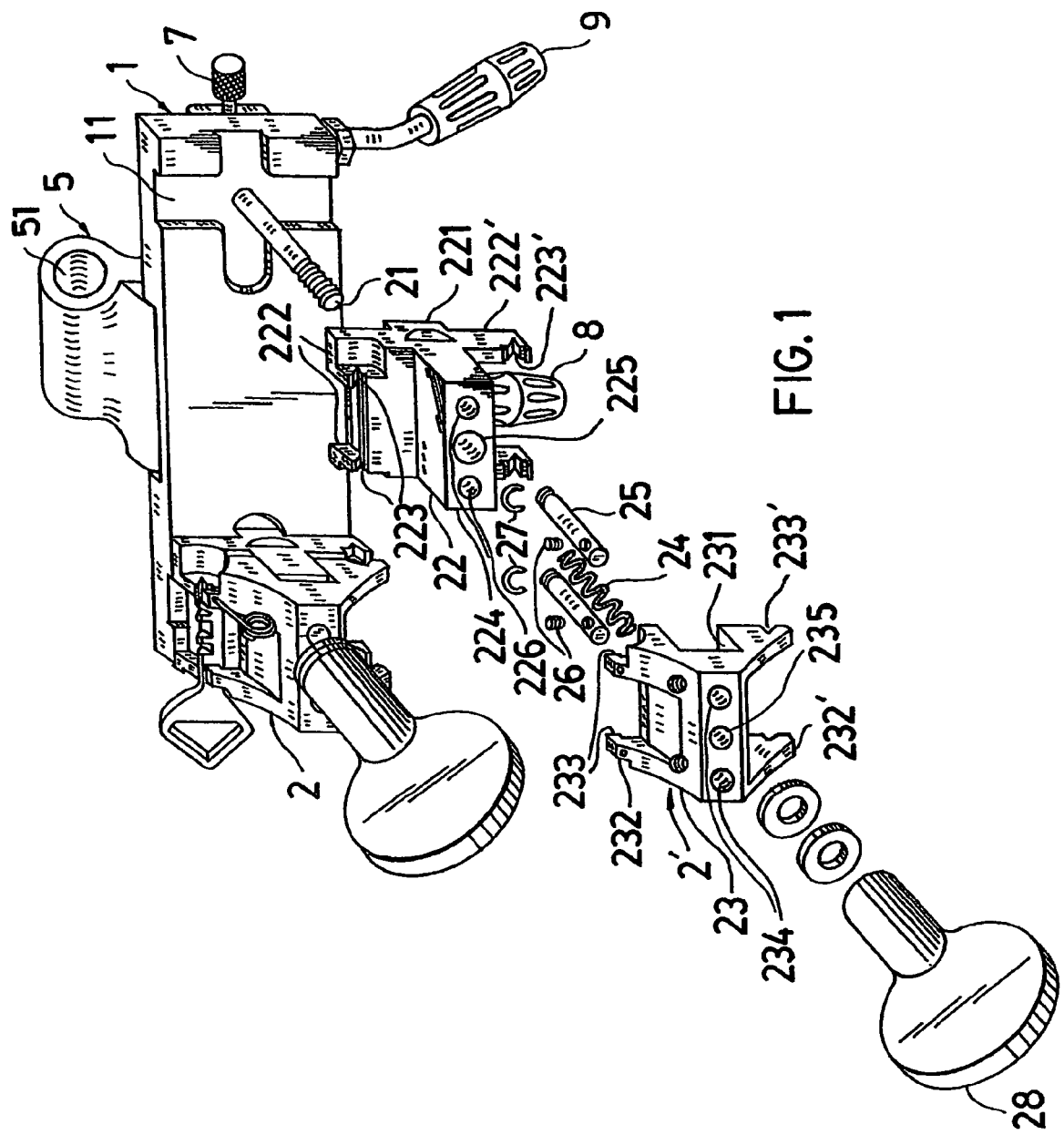
FIG. 1 is a partial exploded perspective view of a clamping device for key duplicating machine with dual pivoted joint according to the present invention.
Figure 2:
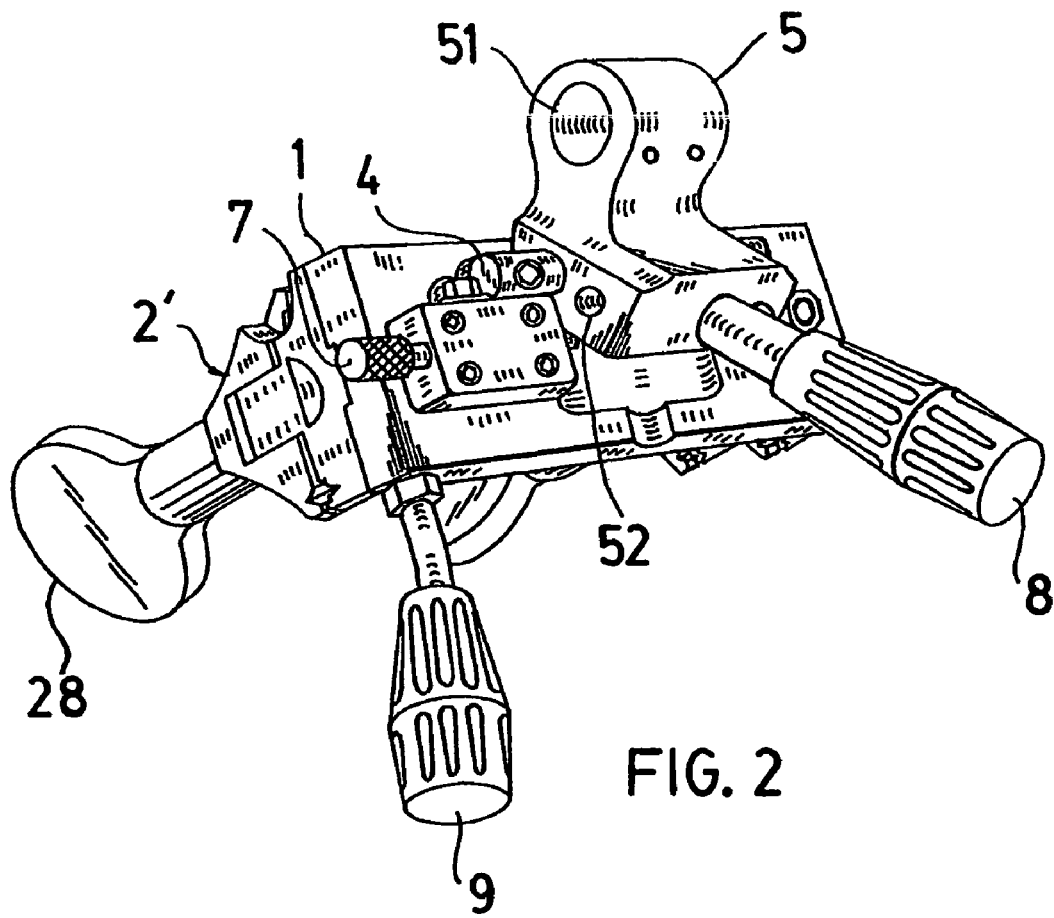
FIG. 2 is a perspective view of a clamping device for key duplicating machine with dual pivoted joint according to the present invention as viewed from back.
Figure 3:
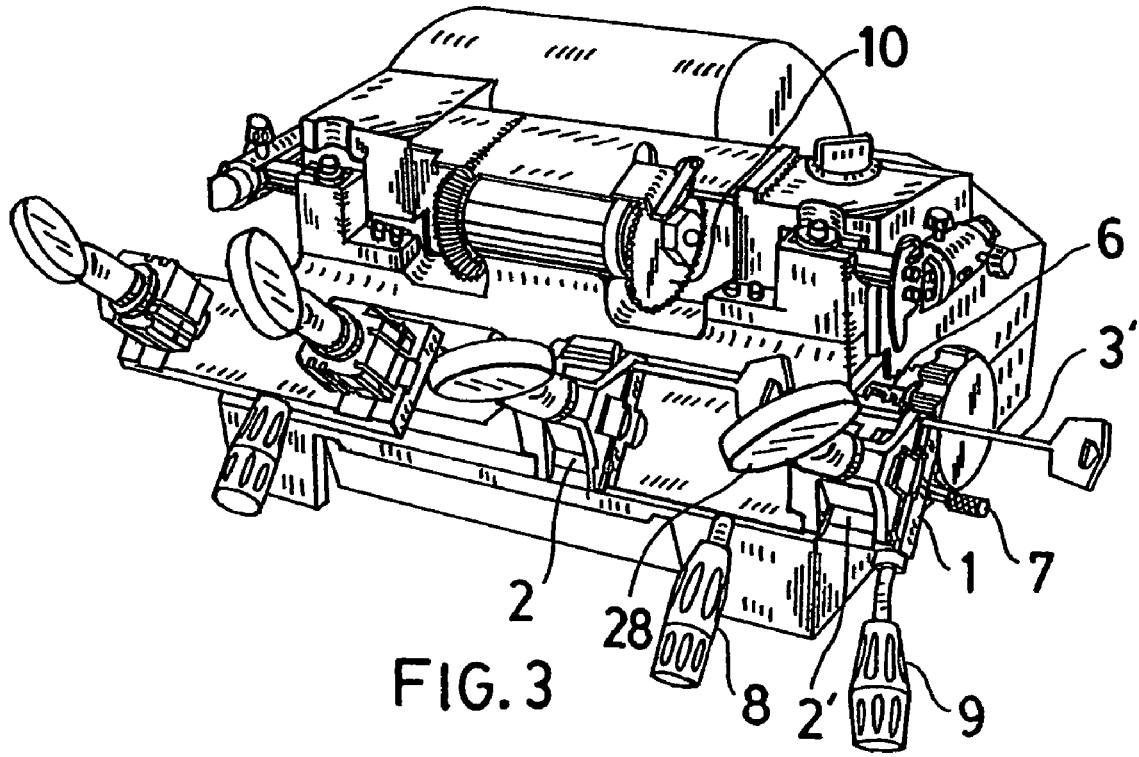
FIG. 3 is a perspective view of a key duplicating machine, wherein a clamping device for key duplicating machine with dual pivoted joint according to the present invention is disclosed.
Figure 4:
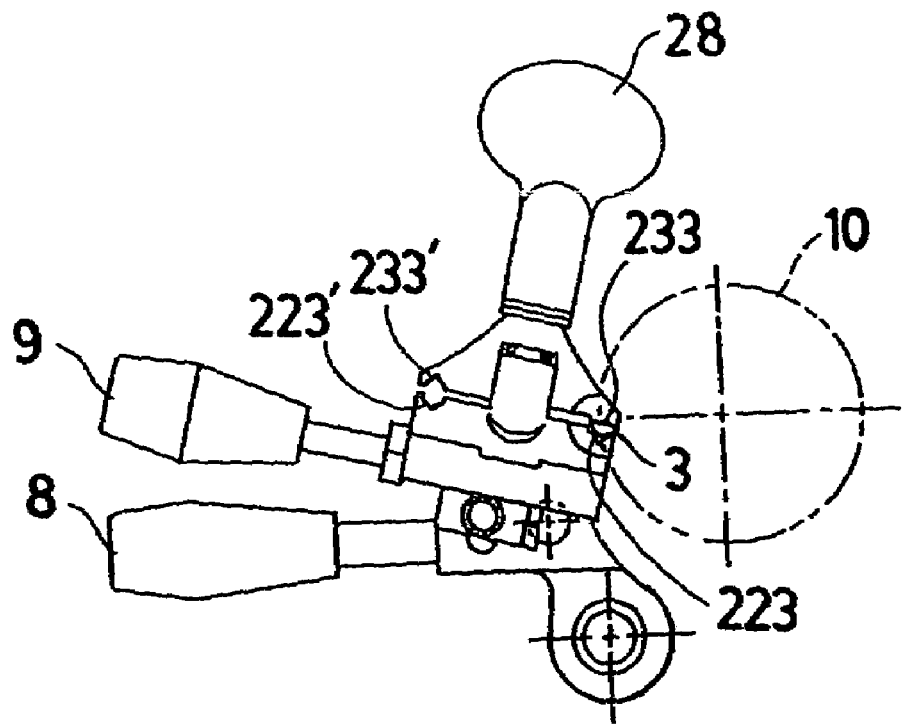
FIG. 4 is a view of a clamping device for key duplicating machine with dual pivoted joint according to the present invention, wherein the vises are rotated to a suitable angular position by means of a first pivoted joint.
Figure 5:
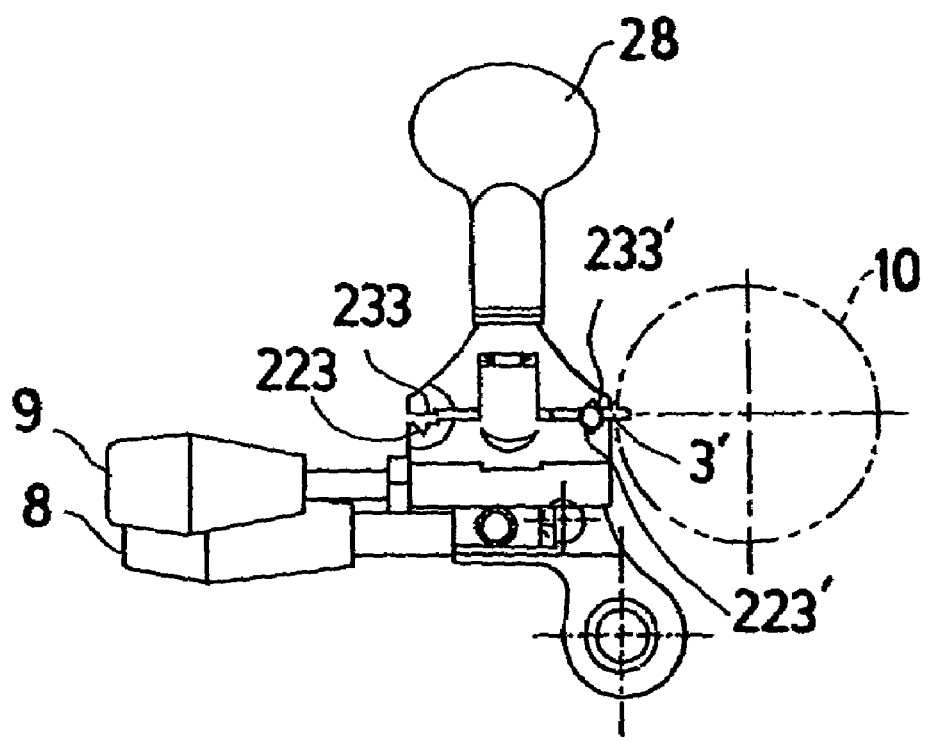
FIG. 5 is a view of a clamping device for key duplicating machine with dual pivoted joint according to the present invention, wherein the vises are rotated to a suitable angular position by means of a second pivoted joint.

Referring to FIGS. 1~5, a clamping device for key duplicating machine with dual pivoted joint which is an embodiment of the present invention, comprises a substrate 1; a pair of left and right symmetrical cross grooves 11 formed on the front side of a substrate, and aligned one with the other, for securing a pair of left and right vises 2, 2'. The left vise 2 is used for clamping a key blank to be processed while the right vise 2' is used for clamping an original key sample. By simply turning and changing from one of the two confronting side edges of the vises to the other, the same pair of vises can clamp different types of keys e.g. a small size of a semi-cylindrical key having a teeth pattern of grooves formed obliquely to the side plane of the key as shown in FIG. 1; and a large size of an elongated cylindrical key having a teeth pattern of groove formed in a direction perpendicular to the side plane of the key as shown in FIG. 5. The left and right vises each comprises a screw 21 horizontally secured to the center portion of the cross groove 11 by means of a nut (not shown); a fixed jaw 22 having a back rectangular protrusion 221 formed at the center portion of the back thereof for engagement with the cross groove 11, and two pairs of upper and lower protrusive clamping feet 222, 222' formed at the upper and lower ends thereof, which are provided with a forward >-shaped notch part, in order to form a clamping half part 223, 223'; and a movable jaw 23 having two pairs of upper and lower protrusive clamping feet 232, 232' formed at the upper and lower ends thereof. The pair of upper protrusive feet 232 are provided with an upright plane part to form a clamping half part 233 while the pair of lower protrusive feet 232' are provided with backward <-shaped notch part, in order to form a clamping half part 233', and hence one type of a clamping part used for clamping a small size of a semi-cylindrical key having a teeth pattern of grooves formed obliquely to the side plane of the key as shown in FIG. 4 can be formed when the pair of upper clamping half parts 233 of the movable jaw are moved towards the pair of upper clamping half parts 223 of the fixed jaw by means of the screw 21, and another type of clamping part used for clamping a large size of an elongated cylindrical key having a teeth pattern of groove formed in a direction perpendicular to the side plane of the key as shown in FIG. 5 can be formed when the pair of lower clamping half parts 233' of the movable jaw are moved towards the pair of lower clamping half parts 223' of the fixed jaw by means of the screw 21. In this regard, by simply turning and changing from one of the two confronting side edges of the vises to the other, the same pair of vises can clamp different types of keys. A longitudinal rectangular protrusion 224 is formed at the front center portion of the fixed jaw, for engagement with a rectangular groove 231 formed at the back center portion of the movable jaw. A central and two side holes 225, 226 are formed in parallel in an integral portion between the longitudinal rectangular protrusion 224 and the back rectangular protrusion 221 of the fixed jaw and aligned one another. The central hole 225 is formed in two sections of different diameters, and the front section hole is bigger than the rear section hole, and used for receiving a compression spring 24, in order to enable the latter to bias against the movable jaw 23, while the rear section hole is used for passing the screw 21 there-through. Two side holes 226 each is formed in two sections of different diameters, and the front section hole is smaller than the rear section hole, and used for receiving a guide post 25 which is having a front end passed through the side hole 234 formed in the intermediate portion of the movable jaw, and is secured on the latter by means of a screw, while the rear section hole is used for receiving a C-shaped pin 27 which is inserted into the rear end of the guide post 25, in order to prevent the latter from being removed from the movable jaw 22. In this regard, the movable jaw 23 can be moved straight towards the fixed jaw 22 in accordance with the two parallel side guide posts. The front end of the screw 21 which penetrates through the central hole 235 of the movable jaw 23 is threadedly engaged with a grip 28, in order to drive the movable jaw to move straight towards the fixed jaw 22 by turning the grip.

As shown in FIG. 2, the present invention further comprises a horizontal pivoted joint 4 arranged at the back upper end of the substrate 1, for pivotally connecting an engagement base 5, in order to form a first pivoted joint, to rotate the pair of vises to a suitable angular position, and to effect duplication of a small size of a semi-cylindrical key 3 having a teeth pattern of grooves formed obliquely to the side plane of the key. A horizontal pivotal connecting hole 51 is formed in the engagement base 5, for pivotally engaging a horizontal pivoted joint 6, (as shown in FIG. 3) in order to form a second pivoted joint, and to effect duplication of a large size of an elongated cylindrical key 3' having a teeth pattern of grooves formed in a direction perpendicular to the side plane of the key. In the present invention, a securing hole 52 is formed at the side edge of the engagement base 5, and parallels the horizontal pivoted joint 4, for receiving a securing pin 7 which is arranged on the back of the substrate 1, and parallels the horizontal pivoted joint, in order to fix the engagement base on the back of the substrate, to prevent both from being pivotally rotated each other, and to enable the first pivoted joint to become ineffective, as shown in FIG. 5. With this, the user can utilize the second pivoted joint i.e. the user can manipulate a grip 8 which is provided at the lower end of the engagement base, in order to rotate the pair of vises to a suitable angular position, to enable a key blank clamped in the vise being cut in a direction perpendicular to the side plane of the key blank by the duplicating tool 10, and to accomplish a duplication of a large size of an elongated cylindrical key. When a small size of a semi-cylindrical key having a teeth pattern of grooves formed obliquely to the side plane of the key is to be duplicated, the user needs to pull the securing pin 7 out of the engagement base 5, in order to enable the horizontal pivoted joint to pivotally rotate with respect to the engagement base, and to enable the first pivoted joint to become effective. With this, the user needs to manipulate a grip 9 which is provided at the right lower end of the substrate, in order to drive the pairs of vises being pivotally rotated to suitable angular position, and enable the key clamped by the vise being cut obliquely to the side plane of the key, as shown in FIG. 4, and to accomplish a duplication of a small size of a semi-cylindrical key.

The invention claimed is:

1. A clamping device for key duplicating machine with dual pivoted joint comprising a substrate having a pair of left and right symmetrical cross grooves formed on front side thereof, for securing a pair of left and right vises;

a horizontal pivoted joint provided on back upper edge of said substrate, for pivotally engaging an engagement base, in order to form a first pivoted joint, to enable said pair of left and right vises being pivotally rotated to a suitable angular position, for effecting a duplication of one type of key;

a horizontal pivotal connecting hole formed on upper edge of said engagement base, for pivotally engaging with a horizontal pivoted joint arranged on body of said duplicating machine, and for forming a second pivoted joint, in order to enable said pair of left and right vises being pivotally rotated to a suitable angular position, and to effect a duplication of another type of key;

wherein said pairs of left and right vises each comprises a screw horizontally secured to center portion of said cross groove, and a fixed jaw having a back rectangular protrusion for engagement with said cross groove, and a longitudinal rectangular protrusion for engagement with a rectangular groove formed at back center portion of a movable jaw, a central hole and two side holes formed in parallel in an integral portion between said longitudinal rectangular protrusion and said back rectangular protrusion of said fixed jaw, and aligned one another, said central hole is used for receiving a compression spring, in order to enable the latter to bias against said movable jaw, and for passing said screw therethrough, said two side holes are used for respectively receiving a guide post, in order to enable said movable jaw being moved straight towards said fixed jaw in accordance with said guide post, for clamping a key; and wherein said fixed jaw and said movable jaw are respectively formed with two pairs of upper and lower protrusive clamping feet at upper and lower ends thereof, said two pairs of upper and lower protrusive clamping feet are respectively formed with a pair of upper and lower clamping half parts, in order to form an upper clamping part for one type of key, and to form a lower clamping part for another type of key, when said movable jaw is moved towards said fixed jaw.

2. The clamping device for key duplicating machine with dual pivoted joint as claimed in claim 1, wherein said upper and lower clamping half parts formed on said fixed jaw are of a <-shaped notch part, said upper clamping half part formed on said movable jaw is of an upright plane part, and said lower clamping half part formed on said movable jaw is of a >-shaped notch part.

3. The clamping device for key duplicating machine with dual pivoted joint as claimed in claim 1, wherein said engagement base is provided with a securing hole parallel to a horizontal pivoted joint, at side edge thereof, for receiving a securing pin secured on back of said substrate, in order to fix said engagement base on said back of said substrate, and to enable said first pivoted joint to become ineffective.

* * * * *